United States Patent
Yamada (10) Patent No.: US 11,867,278 B1
(45) Date of Patent: Jan. 9, 2024

(54) PLANETARY GEAR DEVICE

(71) Applicant: Enplas Corporation, Saitama (JP)

(72) Inventor: Kazuki Yamada, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 17/936,026

(22) Filed: Sep. 28, 2022

(51) Int. Cl.
*F16H 57/08* (2006.01)
*F16H 57/031* (2012.01)
*F16H 57/021* (2012.01)

(52) U.S. Cl.
CPC ......... *F16H 57/031* (2013.01); *F16H 57/021* (2013.01); *F16H 57/08* (2013.01); *F16H 57/082* (2013.01)

(58) Field of Classification Search
CPC ....... F16H 57/08; F16H 57/031; F16H 57/082
See application file for complete search history.

(56) References Cited

U.S. PATENT DOCUMENTS

| | | | | |
|---|---|---|---|---|
| 10,006,532 | B2 * | 6/2018 | Mori | F16H 48/40 |
| 10,221,928 | B2 * | 3/2019 | Mori | F16H 48/08 |
| 11,338,669 | B1 * | 5/2022 | Langenfeld | F16H 57/031 |
| 2011/0077120 | A1 * | 3/2011 | Dirk | F03D 80/70 |
| | | | | 475/348 |

FOREIGN PATENT DOCUMENTS

| | | | | |
|---|---|---|---|---|
| CN | 103742613 | A * | 4/2014 | F16H 3/44 |
| JP | 06-074835 | B2 | 9/1994 | |

* cited by examiner

*Primary Examiner* — Sherry L Estremsky
(74) *Attorney, Agent, or Firm* — Shih IP Law Group, PLLC (57) ABSTRACT

A planetary gear device includes: a housing cover disposed at one end portion of a housing in an axis direction, the housing being configured to house a sun gear and a planetary gear inside the housing; and a carrier cover disposed next to the housing cover in the axial direction in the inside, and configured to support a shaft of the planetary gear from one end portion side in the axial direction. Of a pair of opposing parts opposite to each other in the housing cover and the carrier cover, one opposing part includes an opening that opens in the axis direction, and the other opposing part includes a slide cylindrical part protruding toward inside of the opening in a coaxial manner with an axis of the opening, the slide cylindrical part including an outer peripheral surface that slides on an inner peripheral surface of the opening.

3 Claims, 10 Drawing Sheets

# PLANETARY GEAR DEVICE

TECHNICAL FIELD

The present invention relates to a planetary gear device.

BACKGROUND ART

Planetary gear devices are used for various machines such as automobiles and robots as decelerators for decelerating and outputting an input rotation (see PTL 1).

PTL 1 discloses a planetary gear device that decelerates the rotation of the motor and transmits it to the output shaft. Such a planetary gear device houses components such as a sun gear, an inner gear and a carrier, in a housing.

More specifically, in a planetary gear device, a sun gear is fixed to a drive shaft of a motor inserted from one end surface side of the housing, in a housing. Between the sun gear and the inner gear, which is disposed with the same axis as the sun gear to surround the sun gear, a planetary gear that meshes with both of them is disposed. The planetary gear is supported to a carrier that is rotatably provided with the same axis as the sun gear such that the planetary gear rotates on its own axis and in orbit around the sun gear. The planetary gear converts the rotation of the sun gear into the rotation of the carrier, and outputs it as the rotational force of the carrier through an output shaft inserted to a shaft hole of the carrier.

Incidentally, in the case where a planetary gear device is attached to a motor, especially, in the case of the use for opening closing the back door of an automobile, a planetary gear device with high quietness is desired since it is disposed in the automobile.

In such a planetary gear device with high quietness and high-speed gear rotation, the carrier is supported by using a so-called "floating" support structure without using a bearing for supporting the carrier in order to accommodate working errors and assembling errors, which lead to noise sources. In this manner, the load to be exerted on each planetary gear during the driving is equally distributed to reduce the variable load as much as possible.

CITATION LIST

Patent Literature

PTL 1

Japanese Examined Patent Publication No. H6-74835

SUMMARY OF INVENTION

Technical Problem

In the structure in which the carrier is supported in a "floating" manner as in the above-described known planetary gear device, the carrier is supported through the planetary gear that meshes with the sun gear and the inner gear in practice. With the planetary gear device having the above-mentioned configurations, when the output shaft inserted to the carrier rotate with a tilt and eccentricity, precession and axial deviation of the carrier occur, thus destabilizing the rotation of the carrier itself and generating unusual noise.

In view of the above-described points, an object of the present invention is to provide a planetary gear device that can be stably and quietly driven by suppressing the rotational axial deviation of the carrier by centering the carrier.

Solution to Problem

A planetary gear device of an embodiment of the present invention includes: a housing cover disposed at one end portion of a housing in an axis direction, the housing being configured to house a sun gear and a planetary gear inside the housing; and a carrier cover disposed next to the housing cover in the axial direction in the inside, and configured to support a shaft of the planetary gear from one end portion side in the axial direction. Of a pair of opposing parts opposite to each other in the housing cover and the carrier cover, one opposing part includes an opening that opens in the axis direction, and the other opposing part includes a slide cylindrical part protruding toward inside of the opening in a coaxial manner with an axis of the opening, the slide cylindrical part including an outer peripheral surface that slides on an inner peripheral surface of the opening.

Advantageous Effects of Invention

According to the embodiment of the present invention, it is possible to provide a planetary gear device that suppresses the rotational axial deviation of the carrier for stable driving.

DESCRIPTION OF EMBODIMENTS

An embodiment of the present invention is elaborated below with reference to the accompanying drawings.

Figure 1:
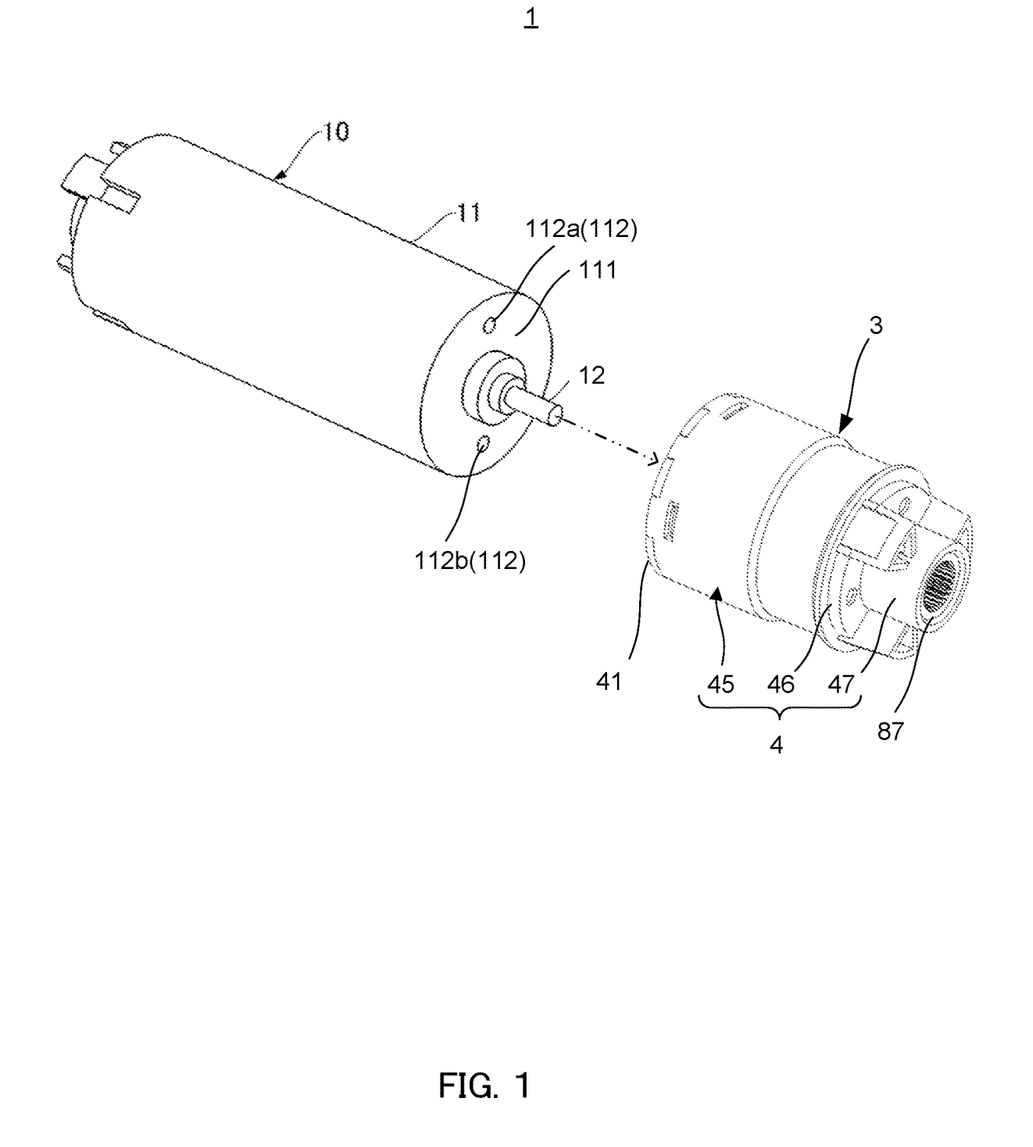
FIG. 1 is a perspective view illustrating an actuator including a planetary gear device of an embodiment of the present invention.
Figure 2:
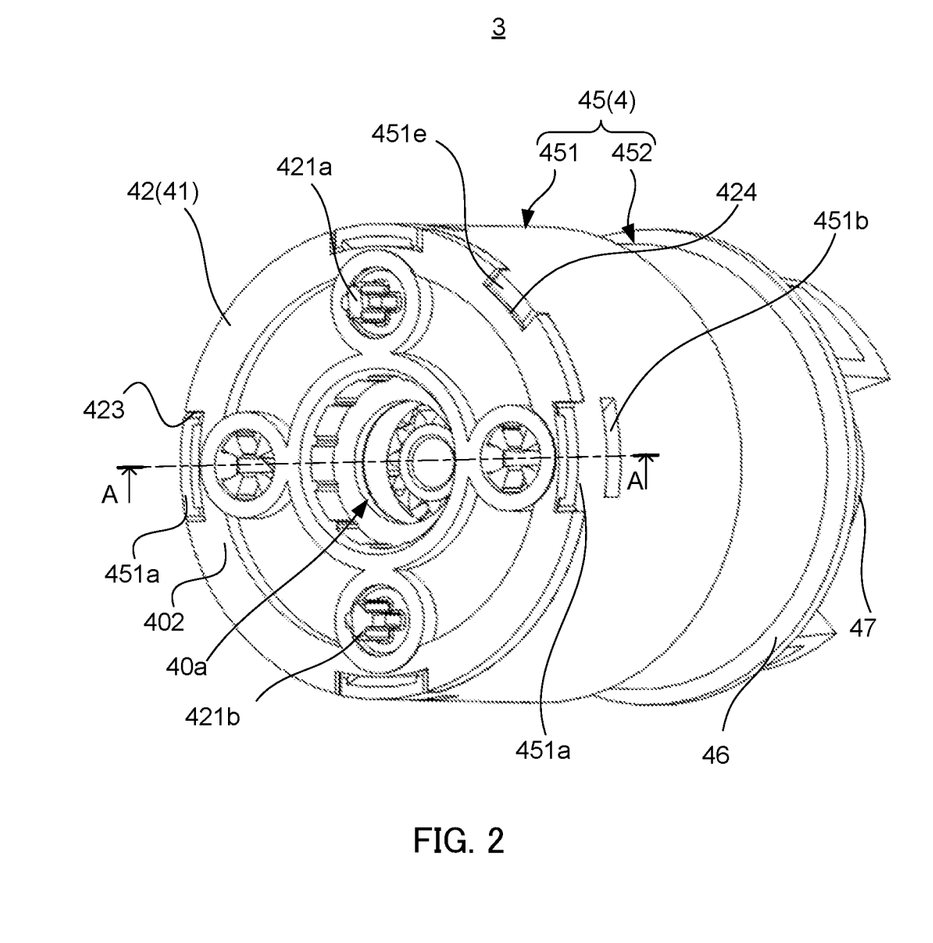
FIG. 2 is a rear perspective view of the planetary gear device of the embodiment of the present invention.
Figure 3:
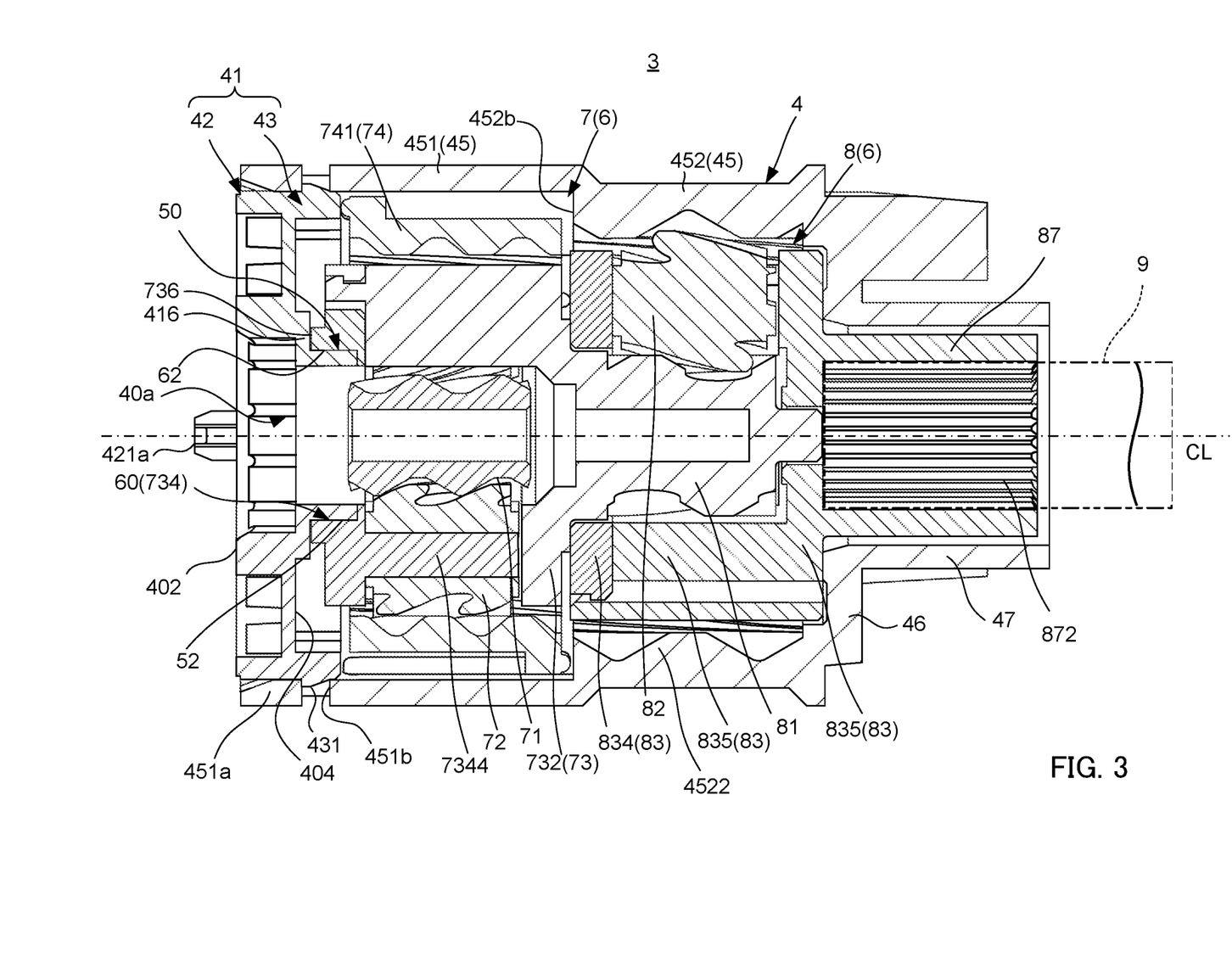
FIG. 3 is a longitudinal sectional view of the planetary gear device taken along the axis direction.
Figure 4:
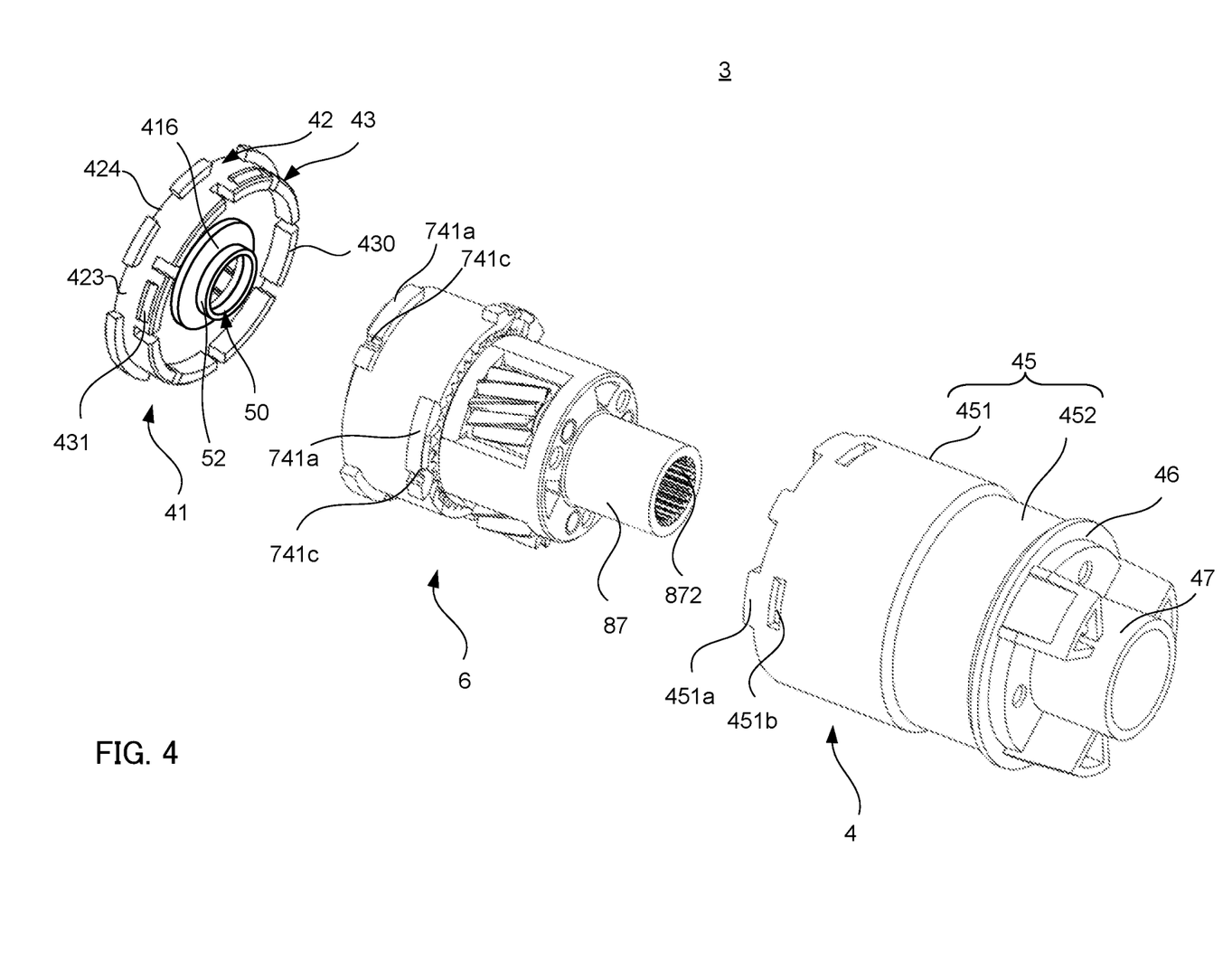
FIG. 4 is an exploded perspective view of the planetary gear device of the embodiment of the present invention.

FIG. 1 is a perspective view illustrating an actuator including a planetary gear device of an embodiment of the present invention, FIG. 2 is a rear perspective view of the planetary gear device, FIG. 3 is a longitudinal sectional view of the planetary gear device taken along the axis direction. FIG. 4 is an exploded perspective view of the planetary gear device of an embodiment of the present invention.

In the following description, the horizontal direction in FIGS. 1 and 3 is referred to as axial direction. In addition, the left direction in FIGS. 1 and 3 is referred to as one side in the axial direction, and the right direction is referred to as the other side in the axial direction. Unless otherwise noted, the axial direction means the axis direction of each member that makes up the planetary gear device.

In addition, the direction orthogonal to the axial direction in FIGS. 1 and 3 is referred to as radial direction. Unless otherwise noted, the radial direction means the radial direction of each member that makes up the planetary gear device. The outside in the radial direction means a direction away from the center of each member that makes up the planetary gear device in the radial direction. The inside in the radial direction means a direction approaching toward the center of each member that makes up the planetary gear device in the radial direction.

In addition, in FIGS. 1 and 3, the direction around the central axis of the planetary gear device that is parallel to the axial direction is referred to as circumferential direction. Unless otherwise noted, the circumferential direction means the circumferential direction of each member that makes up the planetary gear device.

Actuator 1

Planetary gear device 3 illustrated in FIGS. 1 to 4 is attached to motor 10 and makes up actuator 1. For example, actuator 1 is used as an actuator of an electric back door of an automobile used for opening and closing a back door of actuator 1. Note that the usage of actuator 1 is not limited to this.

Motor

Motor 10 illustrated in FIG. 1 includes motor body 11 and rotation shaft 12. Motor operates under the control of a control part (not illustrated in the drawing), and drives planetary gear device 3 by rotating rotation shaft 12.

Motor body 11 includes support surface 111 for supporting planetary gear device 3 at the end surface on the other side in the axial direction (the right end surface in FIG. 1). Motor body 11 includes a plurality of (two, in the present embodiment) motor side fixation holes 112 at support surface 111.

Motor side fixation hole 112 is, for example, an engaging hole that engages with the insertion object, and is provided at even intervals (at 180° intervals) in the circumferential direction at support surface 111. Motor side fixation hole 112 engages with a planetary side fixing part on the planetary gear side for fixing planetary gear device 3 to motor 10. Motor side fixation hole 112 and the planetary side fixing part may fix planetary gear device 3 such that a fastening member (not illustrated in the drawing) such as a bolt is threadedly engaged with motor side fixation hole 112 and the planetary side fixing part in a hole form, for example. In the present embodiment, the planetary side fixing part is protruding planetary side fixing parts 421a and 421b provided in planetary gear device 3 as illustrated in FIGS. 2 and 3. Planetary gear device 3 is fixed to motor 10 by pressing planetary side fixing parts 421a and 421b into motor side fixation hole 112 (112a, 112b). Motor 10 may be a member for supporting planetary gear device 3 described later. Note that the type of the motor is not limited, and various electric motors known in the related art may be employed.

Planetary Gear Device

Planetary gear device 3 outputs the rotation input from motor 10 after decelerating it at a predetermined deceleration ratio. As illustrated in FIGS. 1 to 4, planetary gear device 3 includes housing 4, planetary gear mechanism 6 housed in housing 4, and housing cover 41.

Housing 4

In the present embodiment, housing 4 houses the plurality of planetary gears mechanisms 7 and 8 connected as planetary gear mechanism 6 together with housing cover 41 and achieves the deceleration of multiple stages. In housing 4, planetary gear mechanism 6 decelerates, in two stages, the rotation of rotation shaft 12 through driving of motor 10, and outputs it from output shaft connecting part 87.

Housing Cover 41

For example, housing cover 41 is a member for attaching motor 10 to planetary gear device 3.

As illustrated in FIG. 1 to FIG. 4, housing cover 41 is disposed to close one end portion in the axis direction opening at housing 4. Housing cover 41 includes through hole 40a at a center portion, and includes annular plate-shaped planar fixing part 42 and cylindrical connection cylindrical part 43. Planar fixing part 42 and connection cylindrical part 43 of housing cover 41 are made of synthetic resin and are integrally shaped by injection molding, for example. Rotation shaft 12 of motor 10 is inserted to through hole 40a.

In planar fixing part 42, the outer surface side in the axial direction is a portion fixed to support surface 111 of motor body 11. Planar fixing part 42 includes a plurality of (two, in the present embodiment) planetary side fixing parts 421a and 421b. Planetary side fixing parts 421a and 421b are formed in shapes protruding in the axial direction at axial direction outer surface 402.

Planetary side fixing parts 421a and 421b are provided at planar fixing part 42 at positions corresponding to motor side fixation hole 112 of motor body 11. By inserting (for example, press-fitting) and engaging planetary side fixing parts 421a and 421b to fixation holes 112a and 112b, housing cover 41 is fixed to motor 10 while limiting the rotation of housing cover 41, i.e., the rotation of planetary gear device 3.

In addition, planar fixing part 42 includes a plurality of (the present embodiment, five) recessed engaging recesses 423 and 424 cut in the axial direction at the outer periphery portion. Engaging recesses 423 and 424 are engaged with key protrusion 451e and engaging protrusion 451a of housing 4 in the axial direction.

Planar fixing part 42 includes an opposing part facing planetary gear mechanism 6 in the axis direction, and the opposing part of planar fixing part 42 includes slide cylindrical part 50 that is coaxial with the central axis of planetary gear mechanism 6 and protrudes to planetary gear mechanism 6 side (see FIGS. 3 and 4). Slide cylindrical part 50 is provided to protrude on the other end portion side in the axis direction of planar fixing part 42, i.e., surface 404 on housing 4 side.

Slide cylindrical part 50 is slidably inserted into the center through hole (cover opening) 60 of carrier cover 734 adjacent to housing cover 41 in the axis direction. Slide cylindrical part 50 is coaxial with center through hole 60, and the outer peripheral surface is slidable with inner peripheral surface 62 of center through hole 60 in the circumferential direction around the coaxial axis.

The part of planetary gear mechanism 6 facing the opposing part including slide cylindrical part 50 is the opposing part on the carrier cover 734 side (also referred to as the opposing part on the carrier side), and is center through hole 60 that is open to the one end portion side. Note that surface 404 on the housing 4 side is also referred to as "housing cover inner surface" below.

Slide cylindrical part 50 has an axial core coaxial with planar fixing part 42, protrudes from a position surrounding through hole 40a at surface 404 of planar fixing part 42, and is provided integrally with planar fixing part 42.

Slide cylindrical part 50 is disposed in the state where it is coaxial with center through hole 60 and inserted in center through hole 60, and slide cylindrical part 50 slidably supports planetary gear mechanism 6 in the radial direction. In this manner, the axial deviation between housing 4 where housing cover 41 is attached and planetary gear mechanism 6 (first carrier 73) inside housing 4 is eliminated. In addition, since the sliding portion is provided on the internal diameter side where the circumferential velocity is slow in the driving transmission system of planetary gear device 3, the wearing resistance can be improved, and generation of unusual noise can be suppressed.

On one end portion side of slide cylindrical part 50 in the axis direction, opposing surface part 416 is disposed to surround slide cylindrical part 50 on the outside in the radial direction of slide cylindrical part 50. Opposing surface part 416 faces in a slidable manner the tip of one end side sliding part 736 protruding from the periphery of center through hole 60 of carrier cover 734. In this manner, positioning can be performed while ensuring suitable clearance between the body of carrier cover 734 and housing cover 41 in the axis direction.

Connection cylindrical part 43 is configured in a cylindrical shape with a plurality of arched wall parts 430 protruding from the outer periphery of housing cover inner surface 404 of planar fixing part 42 and extending in the circumferential direction. Connection cylindrical part 43 is provided integrally with planar fixing part 42 at the end portion on one side (the left end portion, in FIGS. 1 and 3) in the axis direction of connection cylindrical part 43. Note that in the following description, the end portion on one side in the axial direction is referred to also as one end portion in the axial direction, the end portion of the other side in the axial direction is also referred to as the other end portion in the axial direction.

Connection cylindrical part 43 attaches housing cover 41 to housing 4 without allowing removal, and houses planetary gear mechanism 6 together with housing 4.

At the outer peripheral surface of predetermined arched wall part 430, connection cylindrical part 43 includes a plurality of (four, in the present embodiment) engaging claw parts 431 that engages with one end portion of housing 4 in the axis direction. Connection cylindrical part 43 is connected with housing 4 through engaging claw part 431.

Housing 4

Figure 5:
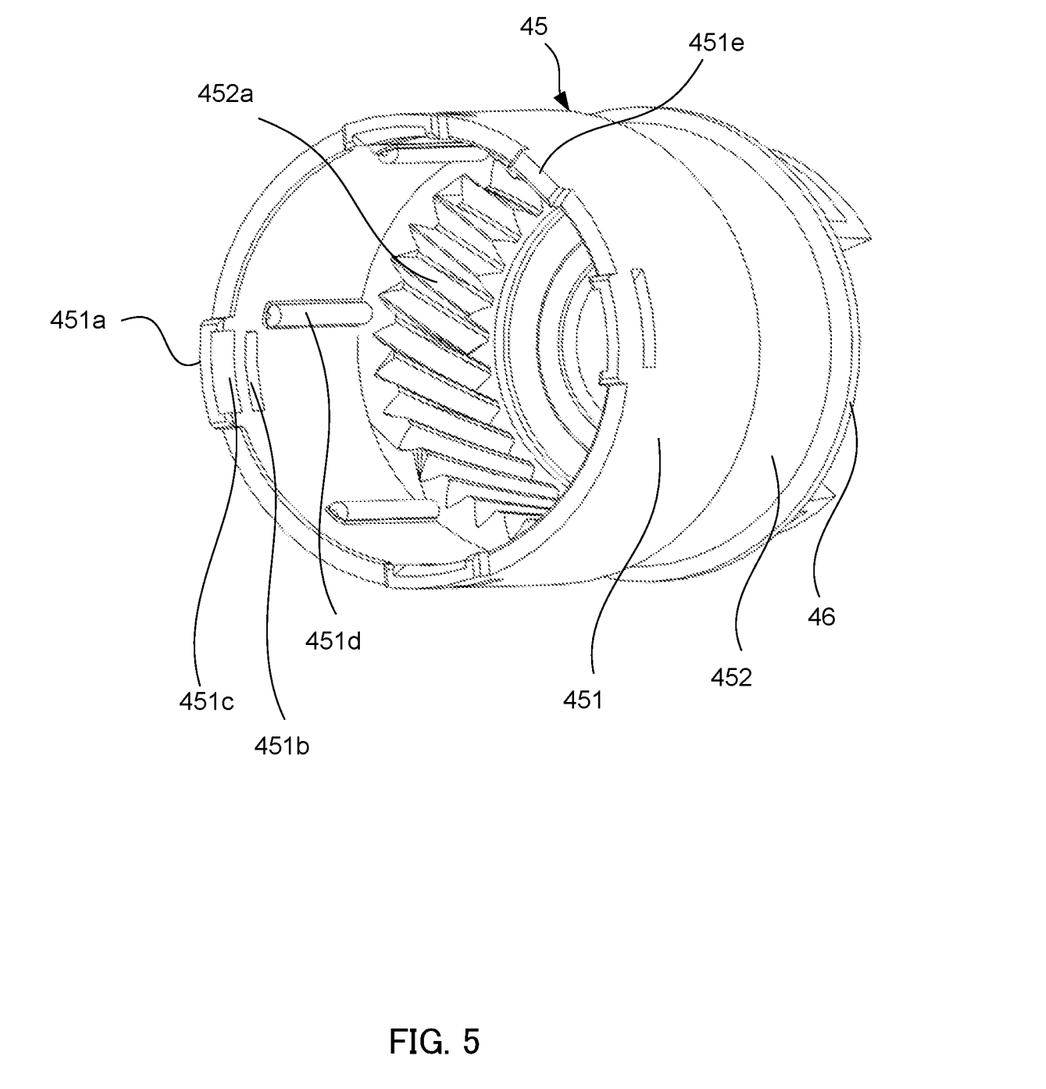
FIG. 5 is a diagram for describing a housing.

FIG. 5 is a perspective view illustrating a housing as viewed from one side in the axial direction. As illustrated in FIGS. 3 and 5, housing 4 is open at an end portion on one side in the axial direction where cover 41 is attached.

Housing 4 includes body cylindrical part 45 and annular part 46 including support cylindrical part 47.

Body cylindrical part 45 has a cylindrical shape and houses planetary gear mechanism 6 inside. More specifically, body cylindrical part 45 includes first housing element 451 that houses first planetary gear mechanism 7, and second housing element 452 that houses second planetary gear mechanism 8 in this order from one side in the axial direction (the left side in FIG. 3). Second housing element 452 houses second planetary gear mechanism 8, with output shaft connecting part 87 protruded from body cylindrical part 45 to the other side in the axial direction (the right side in FIG. 3). Note that housing 4, more specifically, first housing element 451 and second housing element 452, is made of synthetic resin, and is shaped integrally with annular part 46 including support cylindrical part 47 by injection molding, for example.

In first housing element 451, a plurality of (four, in the present embodiment) engaging holes 451b extending in the circumferential direction is provided at one end portion in the axial direction (hereinafter referred to as first end portion of first housing element 451).

Engaging hole 451b is formed in a slit shape extending in the circumferential direction, and engages with engaging claw part 431. At the inner peripheral surface of the first end portion of first housing element 451, guide groove 451c that is cut out in a recessed shape to open to the axis side of housing 4 is provided in a location near engaging hole 451b on one side in the axial direction. When housing cover 41 is attached to housing 4, guide groove 451c guides sliding engaging claw part 431 to engaging hole 451b on the other side in the axial direction, thus facilitating their engagement. Guide groove 451c is provided on the inner peripheral surface side of some engaging protrusions 451a.

Engaging protrusion 451a extends in the axial direction at plural positions in the circumferential direction at the first end portion of first housing element 451. When the first end portion of first housing element 451 is fitted to connection cylindrical part 43 of housing cover 41 from the outside, engaging protrusion 451a engages with engaging recess 423.

Specifically, when fitted to connection cylindrical part 43 of housing cover 41 from the outside, engaging hole 451b engages with engaging claw part 431 of housing cover 41, and engaging protrusion 451a engages with engaging recess 423 of planar fixing part 42 in housing cover 41. Additionally, key protrusion 451e engages with cutout part 424.

In housing 4, the movement in the axial direction and the circumferential direction with respect to connection cylindrical part 43 is limited, through the engagement of engaging hole 451b and engaging claw part 431. In addition, in housing 4, the movement in the circumferential direction with respect to connection cylindrical part 43 is limited, through the engagement of engaging protrusion 451a and engaging recess 423. In addition, in housing 4, housing cover 41 can be assembled to a predetermined position, through the engagement of key protrusion 451e and cutout part 424.

First housing element 451 includes a plurality of (six, in the present embodiment) ridges 451d extending in the axial direction at a portion that faces the outer peripheral surface of first inner gear 74 described later in the radial direction, in the inner peripheral surface.

In the circumferential direction, ridge 451d engages with outer periphery groove part 741c provided at the outer periphery of first inner gear 74 described later. In addition, a small gap is present in the radial direction between the inner peripheral surface of first housing element 451 and the outer peripheral surface of first inner gear 74. With ridge 451d and outer periphery groove part 741c making point contact or line contact with each other, first housing element 451 movably supports first inner gear 74 such that the axis line of first inner gear 74 is slightly tilted with respect to the central axis of first housing element 451 (housing 4).

One end portion of second housing element 452 in the axis direction (hereinafter referred to as first end portion of second housing element 452) is connected to the other end portion of first housing element 451 in the axis direction (hereinafter referred to as second end portion of first housing element 451).

Second housing element 452 includes second inner gear part 452a including teeth extending in the axial direction on the inner peripheral surface. Second inner gear part 452a is helical gear, and engages with second planetary gear 82 of second planetary gear mechanism 8 described later.

Note that second inner gear part 452a may be a spur gear. In addition, second housing element 452 may be interpreted as the inner gear of second planetary gear mechanism 8. In addition, the inner gear of second planetary gear mechanism 8 may be a member provided separately from housing 4. In this case, a second inner gear part is provided at the inner peripheral surface of an inner gear provided separately from housing 4. Then, this inner gear is fixed (internally fitted) to housing 4. This inner gear may be supported in a floating manner by housing 4 as with first inner gear 74 of first planetary gear mechanism 7 described later.

The internal diameter of second housing element 452 is smaller than the internal diameter of first housing element 451. As a result, step 452b is present at the connecting part between second housing element 452 and first housing element 451 (i.e., one side end surface of second housing element 452 in the axis direction).

Note that in the axial direction, step 452b faces the other end portion of first inner gear 74 in the axis direction (hereinafter referred to as second end portion of first inner gear 74). Step 452b limits the movement of first inner gear 74 to the other side in the axis direction, to a predetermined amount.

Annular part 46 has an annular shape, and is connected to the other end portion of housing 4 in the axis direction. More specifically, an outer end portion of annular part 46 in the radial direction is provided integrally with an end portion of housing 4 on the other side.

Support cylindrical part 47 has a cylindrical shape contiguous with the center opening of annular part 46, and is provided to protrude along the axial direction on the other side in the axial direction, i.e., the output side. Support cylindrical part 47 rotatably supports output shaft connecting part 87, with its connection port externally exposed. In this manner, the torque output by output shaft connecting part 87 can be transmitted to the external mechanism by connecting the output shaft, or the output destination member of the rotational force to output shaft connecting part 87. In addition, support cylindrical part 47 limits the movement of second carrier 83 to the other side in the axis direction, to a predetermined amount.

Housing 4 having the above-mentioned configuration is fixed to motor 10 through housing cover 41, with planetary gear mechanism 6 housed therein.

Planetary Gear Mechanism 6

As illustrated in FIGS. 3 and 4, planetary gear mechanism 6, which is housed in housing 4, decelerates the rotation transmitted from motor 10 and outputs it through shaft connecting part 87. Planetary gear mechanism 6 includes first planetary gear mechanism 7 and second planetary gear mechanism 8 disposed along the axis direction.

First Planetary Gear Mechanism 7

Figure 6:
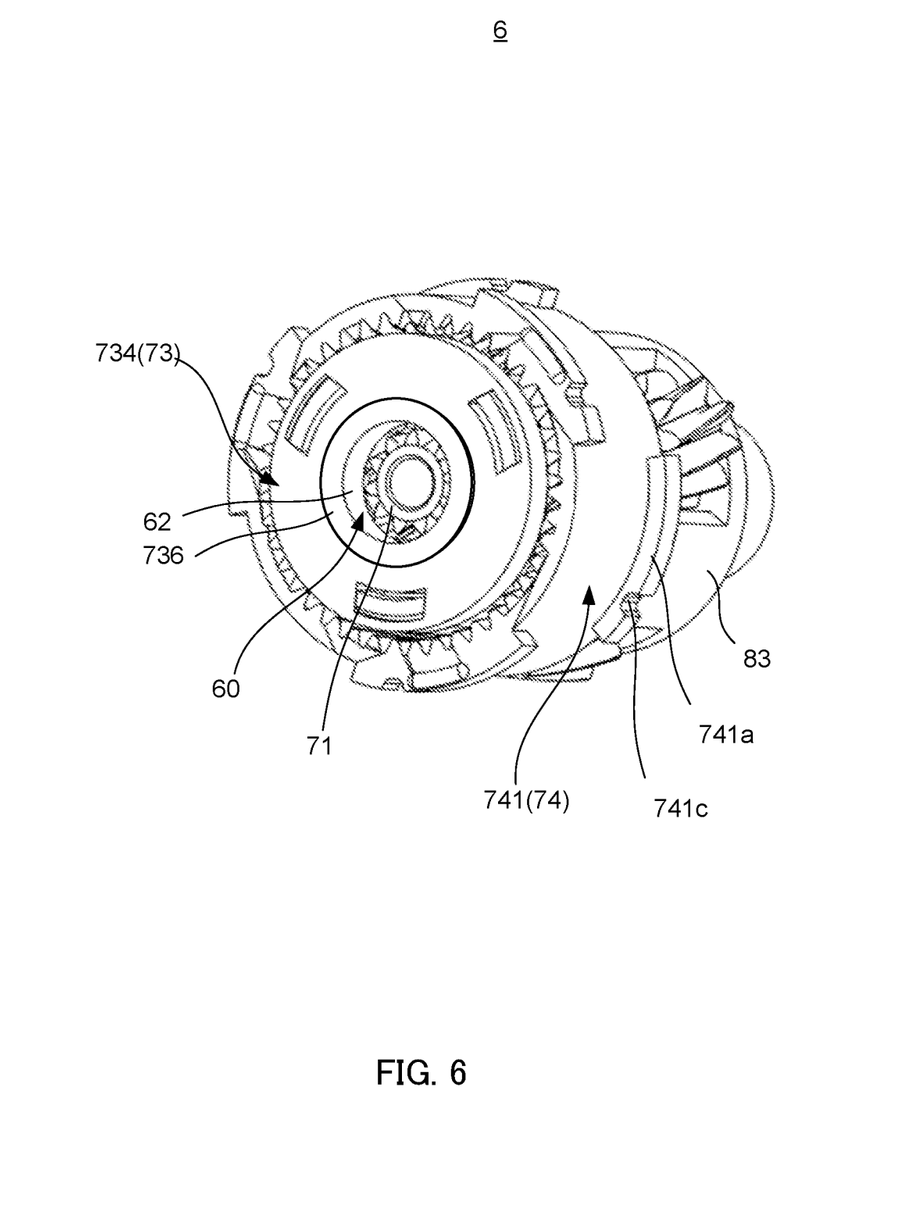
FIG. 6 is a rear perspective view of a planetary gear mechanism housed in a housing in the planetary gear device of the embodiment.
Figure 7:
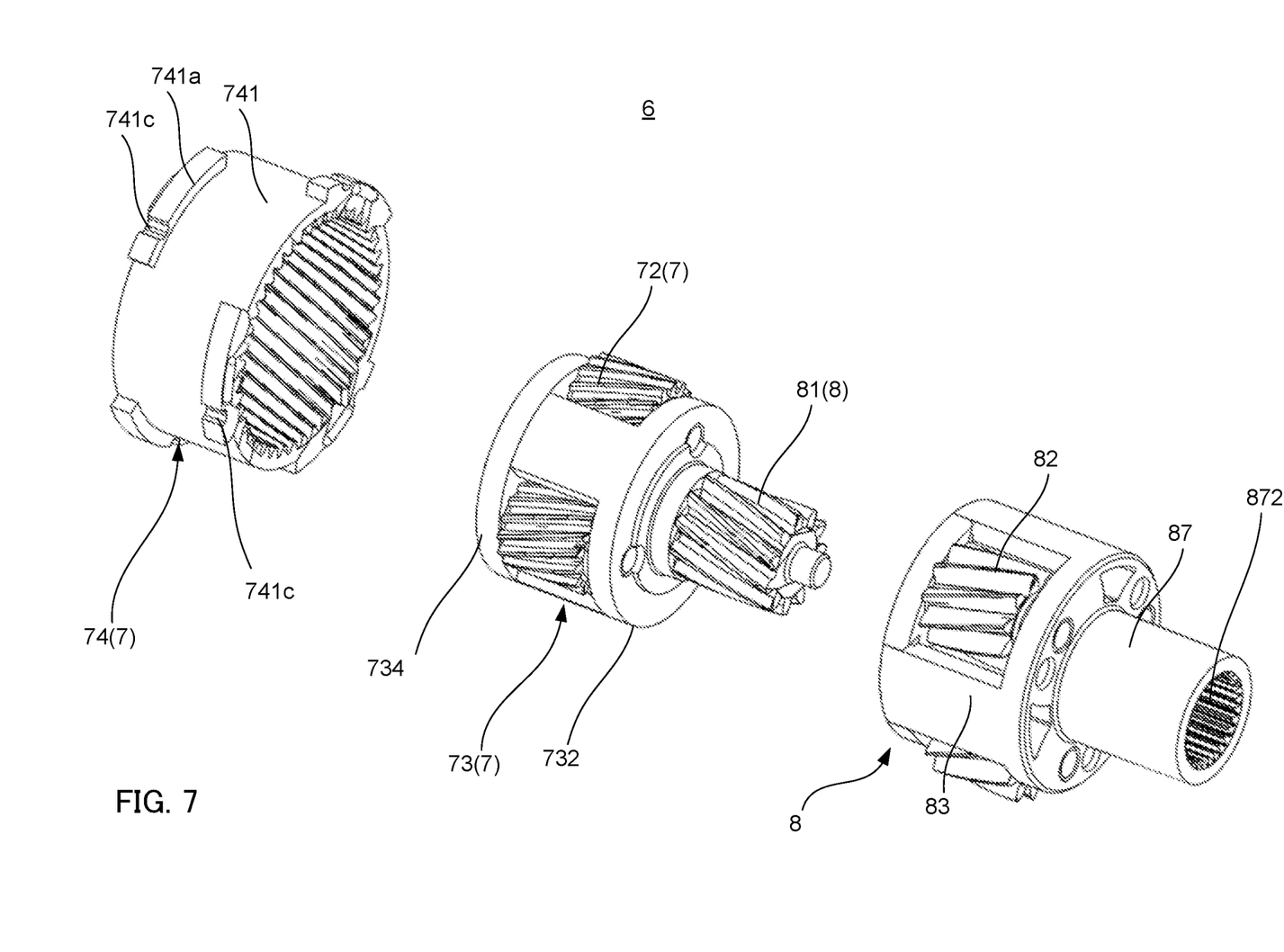
FIG. 7 is an exploded perspective view of the planetary gear mechanism.
Figure 8:
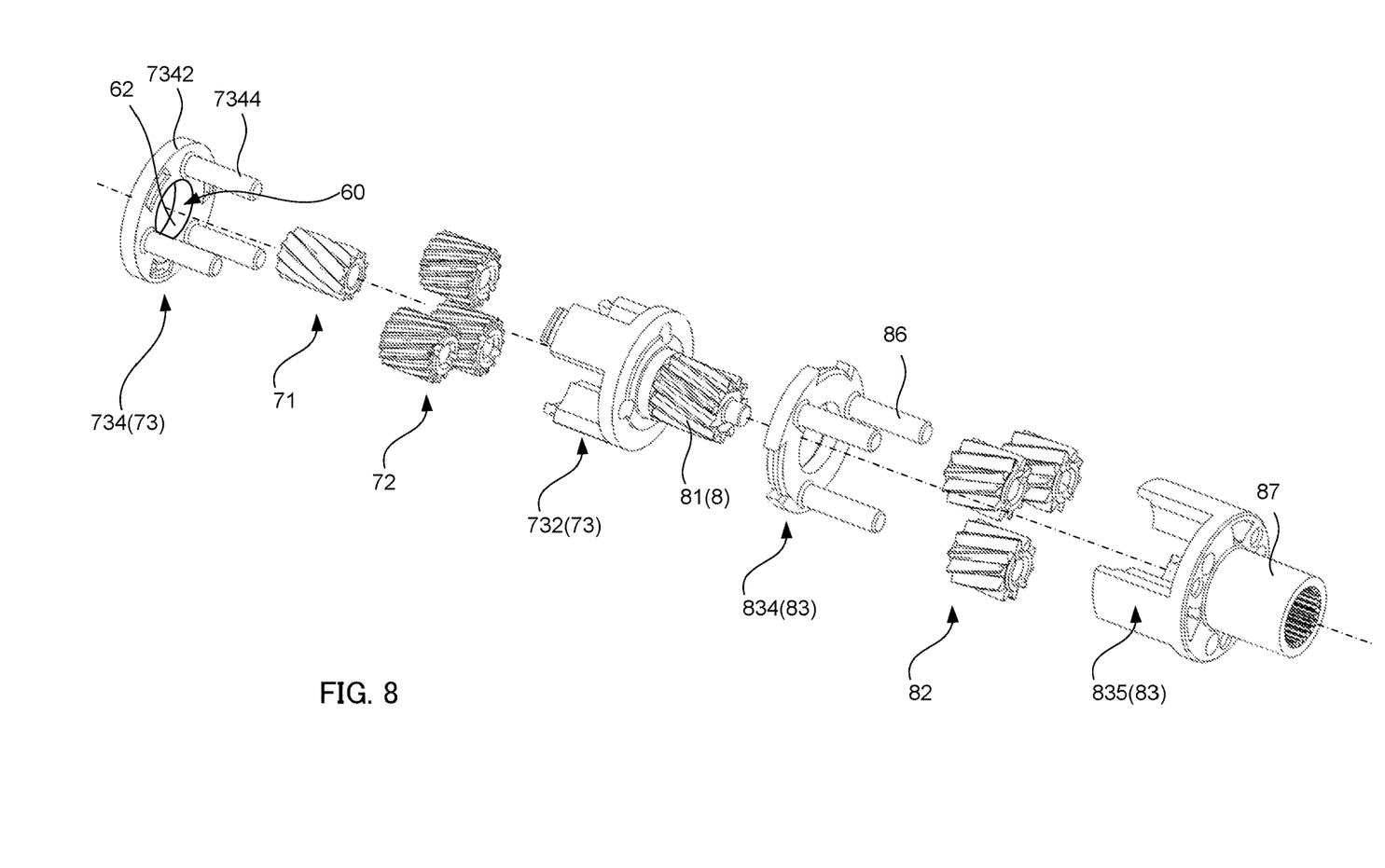
FIG. 8 is an exploded front perspective view illustrating a main configuration of the planetary gear mechanism from which the inner gear is removed.
Figure 9:
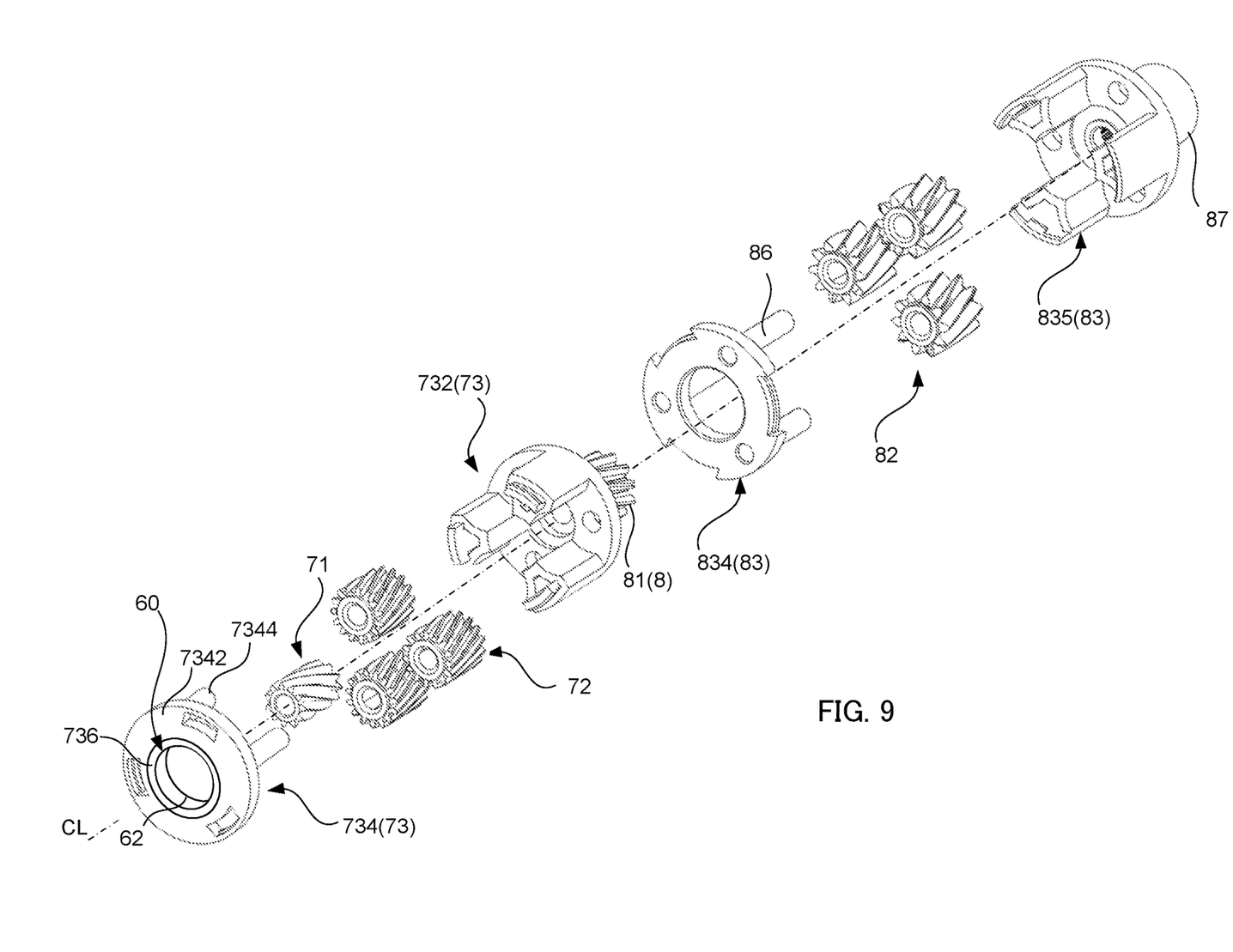
FIG. 9 is an exploded rear-front perspective view including a main configuration of the planetary gear mechanism from which the inner gear is removed.

FIG. 6 is a rear perspective view of a planetary gear mechanism in the planetary gear device of the embodiment housed in the housing, and FIG. 7 is an exploded perspective view of the planetary gear mechanism. In addition, FIG. 8 is an exploded front perspective view illustrating a main configuration of the planetary gear mechanism from which the inner gear is removed, and FIG. 9 is an exploded rear-front perspective view including a main configuration of the planetary gear mechanism from which the inner gear is removed.

First planetary gear mechanism 7 includes sun gear 71, a plurality of planetary gears 72 disposed around sun gear 71, first carrier 73 that rotatably supports the plurality of planetary gears 72, and first inner gear 74. While it suffices that first planetary gear mechanism 7 includes one or more planetary gears 72, it includes three planetary gears 72 in the present embodiment.

Sun gear 71 is an outer gear with a sun teeth portion formed in the outer peripheral surface. Sun gear 71 is connected to rotation shaft 12 of motor 10 and is rotatable with the same central axis as rotation shaft 12. Sun gear 71 rotates through driving of motor 10. For example, the sun teeth portion includes spiral teeth cut obliquely to the axis of sun gear 71, and sun gear 71 of the present embodiment is a so-called helical gear.

Planetary gear 72 is an outer gear with planetary teeth formed in the outer peripheral surface. The plurality of planetary gears 72 is disposed at even intervals between sun gear 71 and first inner gear 74, and engages with both sun gear 71 and first inner gear 74. For example, the plurality of planetary gears 72 is disposed on the same circle around the axis of first planetary gear mechanism 7, and rotatably supported by first carrier 73. In the present embodiment, the planetary teeth are spiral teeth cut obliquely to the shaft of planetary gear 72, and planetary gear 72 of the present embodiment is a so-called helical gear.

Each planetary gear 72 rotates around its own central axis (planetary shaft part 7344) on the basis of the rotation of sun gear 71. In addition, each planetary gear 72 rotates around sun gear 71 on the basis of its rotation and the engagement with first inner gear 74. The central axis of the rotation of planetary gear 72 may coincide with the central axis of sun gear 71.

First carrier 73 supports planetary gear 72 such that planetary gear 72 is rotatable (on its own axis). Additionally, first carrier 73 rotates on the basis of the rotation of planetary gear 72, and transmits the rotation to second planetary gear mechanism 8. In addition, first carrier 73 is formed in a cylindrical shape, and houses planetary gear 72 in the housing opening (omitted in the drawing) formed in its outer peripheral surface. Each planetary gear 72 is supported such that it is rotatable by planetary shaft part 7344 directed to the axis direction in the housing opening. In the present embodiment, planetary gear 72 is attached such that it partially protrudes outward from the housing opening in the radial direction in the state where it is protruded from the outer peripheral surface of first carrier 73. In this manner, the planetary teeth mesh with the inner teeth of first inner gear 74.

In addition, in planetary gear mechanism 6, first carrier 73 includes center through hole 60 that is disposed on the outside in the radial direction of the outer peripheral surface of slide cylindrical part 50 of the opposing part of the housing, and makes up the high speed side end portion, i.e., one end portion in the axis direction of planetary gear mechanism 6.

First carrier 73 includes carrier body 732, and carrier cover 734 that engages with carrier body 732, and center through hole 60 is formed in carrier cover 734.

Carrier body 732 houses the sun gear and planetary gear 72 in a turnable state, and sun gear 81 of second planetary gear mechanism 8 that rotates around the same axis as the sun gear is fixed to carrier body 732. Carrier cover 734 is attached to carrier body 732 from one side in the axial direction.

Carrier cover 734 supports the shaft of planetary gear 72 from one side in the axial direction, i.e., from one end portion side in the axial direction. Carrier cover 734 is disposed next to housing cover 41 in the axial direction inside housing 4. Carrier cover 734 includes ring-shaped body part 7342 including center through hole 60, and planetary shaft part 7344 provided to protrude from body part 7342 in the axial direction.

Planetary shaft part 7344 is inserted in planetary gear 72 in a rotatable manner, and carrier cover 734 is attached to carrier body 732. First carrier 73 supports planetary gear 72 such that it can rotate on its own axis and in orbit around sun gear 71 by engaging it to the outer periphery of sun gear 71 and engaging it with first inner gear 74 at the portion exposed from the housing opening.

The center through hole (cover opening) 60 is disposed such that when planetary gear mechanism 6 is housed inside housing 4 and housing cover 41, slide cylindrical part 50 protruding from the opposite housing cover 41 is slidable inside. In this manner, on one end portion side in the axis direction, carrier cover 71 is rotatable around the axis in the state where it is centered by slide cylindrical part 50 of housing cover 41.

Center through hole 60 is communicated and coaxial with through hole 40a. The axis of center through hole 60 is the central axis of planetary gear device 3. Rotation shaft 12 connected with sun gear 71 with a high circumferential velocity on the upstream side in planetary gear device 3 is inserted to center through hole 60 as with through hole 40a.

First inner gear 74 is disposed at the periphery of first planetary gear 72, and engages with first planetary gear 72. First inner gear 74 includes cylindrical part 741 in which the first inner teeth is provided in the inner peripheral surface. The first inner teeth include spiral teeth cut obliquely to the central axis of cylindrical part 741 (the central axis common to the central axis of rotation shaft 12 of motor 10). Such a cylindrical part 741 is a helical gear and an inner gear.

In the housing space of housing 4, cylindrical part 741 is disposed inside first housing element 451 and at the periphery of first planetary gear 72. In this state, a small gap is present in the radial direction between the outer peripheral surface of cylindrical part 741 and the inner peripheral surface of first housing element 451. The first inner teeth of cylindrical part 741 engages with the first planetary teeth of first planetary gear 72. Note that the first inner teeth may include a tooth that is parallel to the central axis of cylindrical part 741. That is, cylindrical part 741 may be a spur gear and an inner gear.

A plurality of first ridges 741a (in the present embodiment, three first ridges 741a for each of end portions separated in the axial direction) including outer periphery groove part 741c is provided at the outer peripheral surface of cylindrical part 741. First ridge 741a extends in the circumferential direction. Through the engagement of outer periphery groove part 741c and ridge 451d, the rotation of first inner gear 74 with respect to housing 4 is limited. In this manner, cylindrical part 741 is supported such that it can be slightly inclined and moved in the axial direction with respect to first housing element 451 (housing 4). That is, cylindrical part 741 is supported in a floating manner with respect to first housing element 451 (housing 4).

The end portion of cylindrical part 741 on one side in the axis direction (hereinafter referred to as first end portion of cylindrical part 741) faces connection cylindrical part 43 of housing cover 41 in housing 4 with a small gap therebetween in the axial direction. Thus, the movement of cylindrical part 741 to one side in the axis direction is limited to a predetermined amount by housing cover 41.

On the other hand, the end portion of cylindrical part 741 on the other side in the axis direction (hereinafter referred to as second end portion of cylindrical part 741) faces step 452b of second housing element 452 in housing 4 with a predetermined gap therebetween in the axial direction. Thus, the movement of cylindrical part 741 in the axis direction is limited to a predetermined amount by the other side step 452b.

Note that cylindrical part 741 may be fixed in the state where it is non-movable with respect to first housing element 451 (housing 4). In addition, cylindrical part 741 may be composed of first housing element 451 (housing 4).

Second Planetary Gear Mechanism 8

Second planetary gear mechanism 8 outputs the rotation transmitted from first planetary gear mechanism 7 after decelerating it at predetermined deceleration ratio. Second planetary gear mechanism 8 is provided on the other side in the axial direction (the output side and the right side of FIG. 1) relative to first planetary gear mechanism 7.

In the housing space of housing 4, second planetary gear mechanism 8 is disposed in second housing element 452 of housing 4, or more specifically, at a portion corresponding to second inner gear part 452a. Note that second planetary gear mechanism 8 may be omitted.

In the present embodiment, second planetary gear mechanism 8 includes sun gear 81, planetary gear 82, and second carrier 83 that rotatably supports planetary gear 82. While it suffices that second planetary gear mechanism 8 includes one or more planetary gears 82, it includes three planetary gears 82 in the present embodiment.

Sun gear 81 is an outer gear, and includes the sun teeth portion at the outer peripheral surface. In the present embodiment, the sun teeth portion includes spiral teeth cut obliquely to the central axis of sun gear 81, and sun gear 81 is a so-called helical gear.

In the present embodiment, sun gear 81 is fixed in the state where each axis line coincides with first carrier 73 of first planetary gear mechanism 7. In this manner, sun gear 81 rotates in association with the rotation of first carrier 73 of first planetary gear mechanism 7 along with the rotation of first carrier 73 of first planetary gear mechanism 7. That is, along with the rotation of first carrier 73 of first planetary gear mechanism 7, sun gear 81 rotates in the same rotational direction as first carrier 73 of first planetary gear mechanism 7 and at the same rotational speed as first carrier 73 of first planetary gear mechanism 7.

Planetary gear 82 is an outer gear with the planetary teeth formed in the outer peripheral surface. The plurality of planetary gears 82 is disposed at even intervals between sun gear 81 and second inner gear part 452a, and meshes (engages) with both sun gear 81 and second inner gear part 452a. In the present embodiment, the plurality of planetary gears 82 is disposed on the same circle around the axis of second planetary gear mechanism 8, and is supported by planetary shaft 86 of second carrier 83 in a rotatable manner. In the present embodiment, the planetary teeth include spiral teeth cut obliquely to the axis of planetary gear 82, and planetary gear 82 of the present embodiment is a so-called helical gear.

Each planetary gear 82 rotates around its own central axis (planetary shaft 86) on the basis of the rotation of sun gear 81. In addition, each planetary gear 82 rotates around sun gear 81 on the basis of its own rotation and the engagement with second inner gear part 452a. The central axis of the rotation of planetary gear 82 may coincide with the central axis of sun gear 81.

Second carrier 83 supports planetary gear 82 such that it is rotatable (on its own axis). Additionally, second carrier 83 rotates on the basis of the rotation of planetary gear 82, and transmits it to the output shaft 9 connected to output shaft connecting part 87.

Second carrier 83 includes, for example, gear holding part 834, and second carrier body 835 that holds output shaft connecting part 87.

Gear holding part 834 includes planetary shaft 86 provided in the axis direction at a ring part making up the end portion of second carrier 83 on one side in the axis direction, and rotatably supports planetary gear 82 with the shaft part inserted thereto. Gear holding part 834 is joined to second carrier body 835. Each planetary gear 82 is exposed from the housing opening (omitted in the drawing) formed in the outer peripheral surface of second carrier body 835. In this manner, planetary gear 82 is attached in the state where it partially protrudes outward from the housing opening in the radial direction and protrudes from the outer peripheral surface of second carrier 83. In this manner, the planetary teeth mesh with the teeth of second inner gear part 452a.

Output shaft connecting part 87 is provided to protrude on the other side (output side) than second carrier body 835. Output shaft connecting part 87 is formed in a cylindrical shape with a smaller size than second carrier body 835, and the output shaft is connected to carrier hole 872 on the inside of output shaft connecting part 87 in the radial direction.

Note that, for example, the output shaft is formed in a shaft shape, held by second carrier 83, and rotated together with second carrier 83. Output shaft connecting part 87 has a tooth with a knurling shape at the inner periphery of the end portion on the output side.

Operation and Effect of Planetary Gear Device 3

Figure 10:
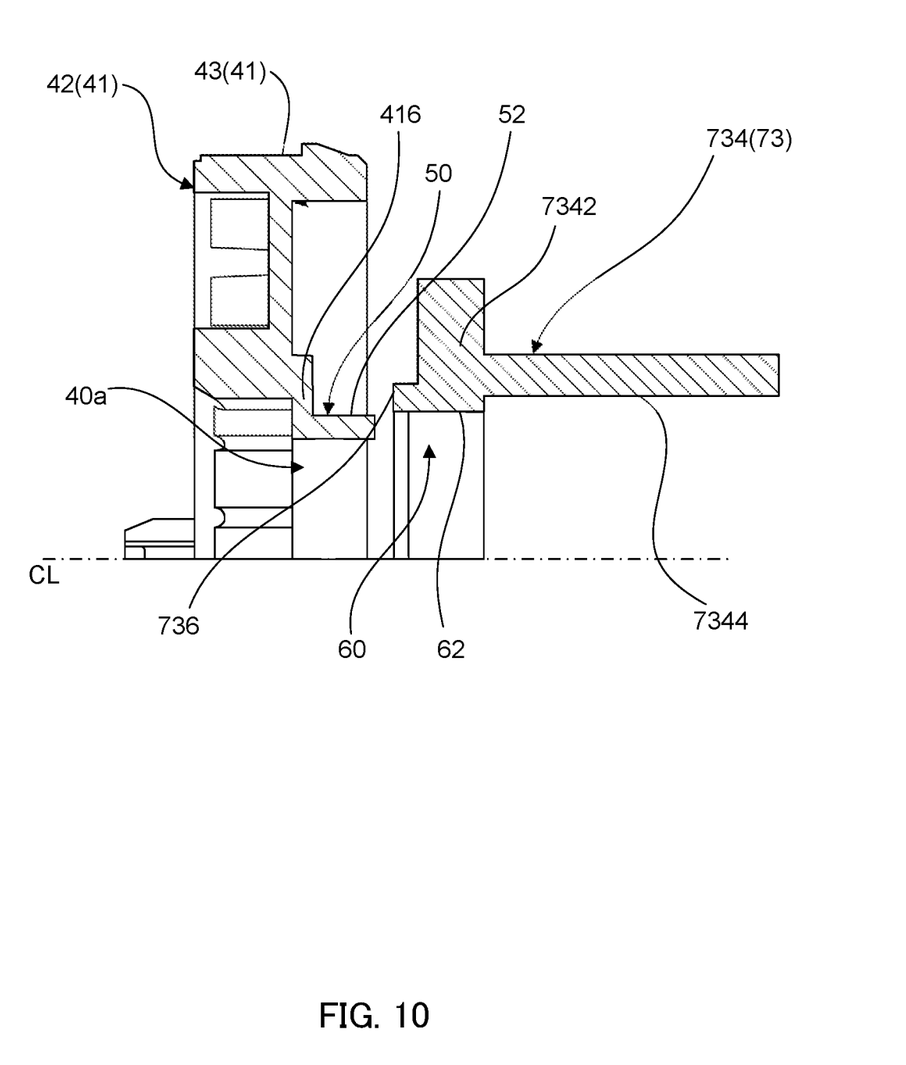
FIG. 10 is a partially enlarged sectional view of a sliding portion of a housing cover and a carrier cover.

FIG. 10 is a partially enlarged sectional view of a sliding portion of carrier cover 734 and housing cover 41. Planetary gear device 3 of the present embodiment includes housing cover 41 and carrier cover 734. Housing cover 41 is attached at one end portion, in the axis direction, of housing 4 that houses sun gear 71 and planetary gear 72 inside. Carrier cover 734 is disposed next to housing cover 41 in the axial direction inside housing 4, and supports the shaft of planetary gear 72 from one end portion side of the housing 4 in the axis direction.

Of the pair of opposing parts opposite to each other in housing cover 41 and carrier cover 734, one opposing part (carrier cover 734) includes center through hole 60 that opens in the axis direction. In addition, the other opposing part (housing cover 41) of the pair of opposing parts includes slide cylindrical part 50 that protrudes coaxially with center through hole 60 toward the inside of center through hole 60. Outer peripheral surface 52 of slide cylindrical part 50 slides on inner peripheral surface 62 of center through hole 60. In addition, carrier cover 734 is coaxially and slidably supported through center through hole 60 that slides on outer peripheral surface 52 of slide cylindrical part 50 of housing cover 41. In addition, opposing surface part 416 that faces opening edge part 736 of carrier cover 734 in a slidable manner is disposed to surround slide cylindrical part 50 on the outside of slide cylindrical part 50 in the radial direction on the one end portion side of slide cylindrical part 50 in the axis direction. Tip part 736 of carrier cover 734 is provided in a slidable manner at opposing surface part 416.

When planetary gear device 3 is driven, opening 60 of carrier cover 734 slides on the outer peripheral surface of slide cylindrical part 50 of housing cover 41, and thus they are both coaxially driven into rotation.

In this manner, in planetary gear device 3, outer peripheral surface 52 of slide cylindrical part 50, which is the housing side opposing part, and inner peripheral surface 62 of center through hole 60 on the planetary gear mechanism 6 side slide on each other on one end portion side in the axis direction, and planetary gear mechanism 6 rotates coaxially with slide cylindrical part 50 in the circumferential direction. That is, movement in the radial direction of one end portion in the axis direction of planetary gear mechanism 6 in housing 4 is suppressed, and the axial core of planetary gear mechanism 6 or the first carrier does not deviate from housing 4. In this manner they coincide with each other, thus preventing deviation of the axial cores. Therefore, the rotational axial deviation of the carrier can be suppressed, and generation of unusual noise due to axial deviation of first carrier 73 can be suppressed without causing rotation of the output shaft connected with output shaft connecting part 87 with tilt and eccentricity, and without precession. In this manner, stable rotation of first carrier 73 in housing 4 is achieved, and thus quietness can be improved. In addition, when incorporating sun gear 71 into planetary gear device 3, their positions are set with slide cylindrical part 50, which is the housing side opposing part, and inner peripheral surface 62 of center through hole 60 on planetary gear mechanism 6 side, and thus disengagement defect of the teeth of planetary gear 72 and the teeth of sun gear 71 (for example, a defect in which a tooth engages with a tooth shifted by one from the tooth that should be engaged) can be suppressed, improving assemblability.

In addition, the coaxial slide structure of slide cylindrical part 50 and center through hole 60 in housing cover 41 and carrier cover 734 may be a configuration in which carrier cover 734 is provided with a slide cylindrical part slidably inserted to the opening of housing cover 41.

In addition, the configuration of opening 60 and slide cylindrical part 50 that slide in the circumferential direction of first carrier 73 and housing cover 41 is disposed inside the axial core of planetary gear 72 in the radial direction of sun gear 71. That is, in the configuration in which first carrier 73 (carrier cover 734) turns with the same axis with housing 4 (housing cover 41) in planetary gear device 3, the axial deviation of them can be prevented at a position near the rotation axis.

Thus, in comparison with the configuration in which the slide structure on the housing side and the carrier side is disposed on the outside than the axis of the planetary gear in the radial direction of the sun gear, the closeness to the rotation center allows for easier adjustment of the axial deviation, with the reduced circumferential velocity.

The embodiments disclosed here should be considered illustrative in all respects and not restrictive. The scope of the invention is indicated by the claims rather than the description given above, and it is intended that all changes within the meaning and scope of the claims be included. In other words, the above description of the configuration of the device and the shape of each part is an example, and it is clear that various changes and additions to these examples are possible within the scope of the present invention.

INDUSTRIAL APPLICABILITY

The planetary gear device according to the embodiment of the present invention provides an effect of suppressing the rotational axial deviation of the carrier for stable driving, and is useful as a planetary gear device used for an actuator for opening closing a back door and the like.

REFERENCE SIGNS LIST

1 Actuator
3 Planetary gear device
4 Housing
6 Planetary gear mechanism

7 First planetary gear mechanism
8 Second planetary gear mechanism
Motor
11 Motor body
12 Rotation shaft
40a Through hole
41 Housing cover
42 Fixing part
43 Connection cylindrical part
Body cylindrical part
46 Annular part
47 Support cylindrical part
48, 77 Opposing part
50 Slide cylindrical part
52 Outer peripheral surface
60 Center through hole (cover opening)
62 Inner peripheral surface
71, 81 Sun gear
72, 82 Planetary gear
73 First carrier
74 First inner gear
83 Second carrier
86 Planetary axis
87 Output shaft connecting part
111 Support surface
112, 112a, 112b Fixation hole
402 Axis direction outer surface
404 Housing cover inner surface
421a, 421b Planetary side fixing part
423, 424 Engaging recess
430 Arched wall part
431 Engaging claw part
431a Portion
451 First housing element
451a Engaging protrusion
451b Engaging hole
451c Guide groove
451d Ridge
451e Key protrusion
452 Second housing element
452a Second inner gear part
452b Step
482 Outer periphery part
732 Carrier body
734 Carrier cover
741 Cylindrical part
741a First ridge
741c Outer periphery groove part
774 Annular surface
834 Gear holding part
835 Second carrier body
7342 Body part
7344 Planetary shaft part

The invention claimed is:

1. A planetary gear device, comprising:
a housing cover disposed at one end portion of a housing in an axis direction, the housing being configured to house a sun gear and a planetary gear inside the housing; and
a carrier cover disposed next to the housing cover in the axial direction in the inside, and configured to support a shaft of the planetary gear from one end portion side in the axial direction, wherein
of a pair of opposing parts opposite to each other in the housing cover and the carrier cover, one opposing part includes an opening that opens in the axis direction, and the other opposing part includes a slide cylindrical part protruding toward inside of the opening in a coaxial manner with an axis of the opening, the slide cylindrical part including an outer peripheral surface that slides on an inner peripheral surface of the opening,
wherein the opposing part is an opposing part of the carrier cover;
wherein the other opposing part is an opposing part of the housing cover; and
wherein the carrier cover is slidably supported in the coaxial manner through the opening that slides on the outer peripheral surface of the slide cylindrical part of the housing cover.

2. The planetary gear device according to claim 1, further comprising an opposing surface part disposed to surround the slide cylindrical part on outside in a radial direction of the slide cylindrical part on one end portion side in an axis direction of the slide cylindrical part, the slide cylindrical part facing in a slidable manner an opening edge part of the carrier cover.

3. The planetary gear device according to claim 2, wherein the carrier cover includes a one end side sliding part protruded from a periphery of the opening to the one end portion side and configured to slide on the opposing surface part.

* * * * *